US009797456B2

(12) United States Patent
Randle

(10) Patent No.: US 9,797,456 B2
(45) Date of Patent: Oct. 24, 2017

(54) VARIABLE MECHANICAL ADVANTAGE SHAFT COUPLING

(71) Applicant: RANDLE ENGINEERING SOLUTIONS LTD, Warwick Warwickshire (GB)

(72) Inventor: Steven James Randle, Stratford upon Avon (GB)

(73) Assignee: Randle Engineering Solutions LTD, Warwick, Warwickshire (GB)

( * ) Notice: Subject to any disclaimer, the term of this patent is extended or adjusted under 35 U.S.C. 154(b) by 0 days.

(21) Appl. No.: 14/905,478

(22) PCT Filed: Jul. 14, 2014

(86) PCT No.: PCT/GB2014/052148
§ 371 (c)(1),
(2) Date: Jan. 15, 2016

(87) PCT Pub. No.: WO2015/008051
PCT Pub. Date: Jan. 22, 2015

(65) Prior Publication Data
US 2016/0169293 A1   Jun. 16, 2016

(30) Foreign Application Priority Data

Jul. 16, 2013   (GB) .................................. 1312725.3

(51) Int. Cl.
*B62D 1/16*   (2006.01)
*F16D 3/10*   (2006.01)
(Continued)

(52) U.S. Cl.
CPC ................. *F16D 3/10* (2013.01); *B62D 1/16* (2013.01); *B62D 5/00* (2013.01); *B62D 5/0409* (2013.01); *F16H 35/008* (2013.01)

(58) Field of Classification Search
CPC .... F16D 3/10; B62D 1/16; B62D 5/00; B62D 5/0409; F16H 35/008
See application file for complete search history.

(56) References Cited

U.S. PATENT DOCUMENTS

| 4,576,056 A | 3/1986 | Barthelemy |
| 5,775,459 A * | 7/1998 | Jorg ..................... B62D 5/0439 180/444 |
| 2005/0016788 A1* | 1/2005 | Hidaka .................. B62D 5/008 180/443 |

FOREIGN PATENT DOCUMENTS

| DE | 102005005426 A1 | 8/2006 |
| WO | 2015008051 A2 | 1/2015 |

OTHER PUBLICATIONS

International Search Report and Written Opinion received for Patent Application No. PCT/GB2014/052148, mailed on Jun. 25, 2015. 9 pages.

* cited by examiner

*Primary Examiner* — Kevin Hurley
*Assistant Examiner* — Marlon A Arce
(74) *Attorney, Agent, or Firm* — Finch & Maloney PLLC

(57) ABSTRACT

A variable mechanical advantage shaft coupling (1), typically used in an electric power assisted steering system, comprising: an input shaft (2); an output shaft (3); and at least one lever (9), each lever comprising: a lever body; a first connection (5) connecting the lever body to a first shaft (2) of the input shaft and the output shaft at a point offset from an axis of rotation of the first shaft so that the lever body can pivot relative to the first shaft; a second connection (11) connecting the lever body to a second (3), different, shaft of the input shaft and the output shaft at a point offset from its axis of rotation so that the lever body can pivot relative to the second shaft; and a fulcrum point about which (Continued)

the lever body can pivot; in which each first connection (5) is able to slide along an axis substantially parallel to the axes of rotation of the first and second shafts (2, 3) along the respective lever body, each lever connecting the input and output shafts (2, 3) with a mechanical advantage that varies dependent upon the position of each sliding connection along the first shaft.

20 Claims, 4 Drawing Sheets

(51) Int. Cl.
  *B62D 5/00* (2006.01)
  *F16H 35/00* (2006.01)
  *B62D 5/04* (2006.01)

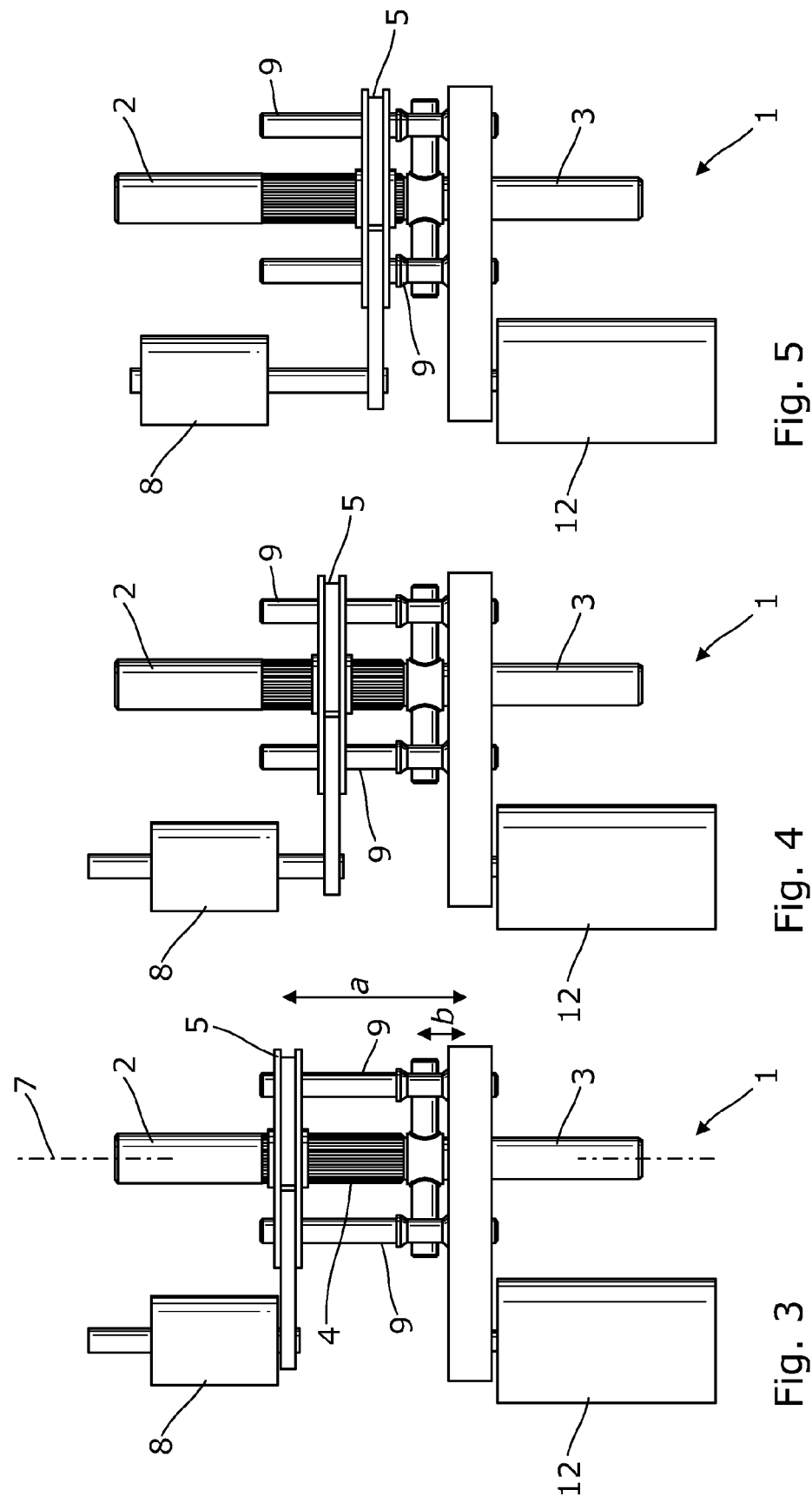

VARIABLE MECHANICAL ADVANTAGE SHAFT COUPLING

This invention relates to a variable mechanical advantage shaft coupling, such as may, non-exclusively, be used in an electric power assisted steering system.

The development of conventional hydraulically power assisted steering racks is expensive and time consuming. Lower volume manufacturers are typically forced to use units sourced from high volume cars. Packaging and tuning of these systems is not straightforward, as modification options are severely limited.

Electrically powered systems offer potential advantages in tuning and energy efficiency, with the added benefit of remaining active when the engine is not running, which is an advantage for hybrid vehicles.

Open centre hydraulic systems constitute the vast majority of power assisted steering (PAS) systems in use. In principle, a torsion bar is used to measure hand wheel torque, and in turn controls the flow of hydraulic fluid to one of two chambers typically integral in a steering rack. This fluid power assists the movement of the steering gear in the direction determined by the hand wheel. Hydraulic pressure is supplied by an engine driven pump. A constant power loss is incurred due to the fact that fluid passes around the system at all times, and is tapped by the system's valving when steering assistance is required.

Closed centre hydraulic systems are used in volume production by Citroen, but are otherwise unpopular. The closed centre system avoids the constant flow power loss of the open centre arrangement, and is more compatible with the central high pressure hydraulic supply favoured by Citroen for powering a number of otherwise independent vehicle systems. Disadvantages of closed centre valving are a lack of steering feedback which some drivers find unnerving, and difficulty in avoiding what feels like a 'notch' in the steering about the straight ahead, as assistance is switched from one side to the other.

Both hydraulic solutions suffer from the following drawbacks:

- Although the servo mechanism itself is relatively simple, the system and particularly the pump require a large number of precision components to be machined and assembled. While efficient mass production techniques have made these systems relatively affordable, the manufacturers are starting with a high component cost and it will be difficult for them to achieve significant cost savings with this technology.
- The systems are relatively inefficient in converting the power they take from the engine. This has not been much of an issue until recently, but size, weight and power consumption are becoming increasingly important.
- Loss of engine power causes loss of power assistance. Furthermore, the steering efforts required on loss of hydraulic pressure are very much higher than had there been no assistance system fitted i.e. manual steering. Although the risk is low, the potential hazard is clear, particularly in large cars where steering without assistance can be difficult. A much less serious but more common inconvenience is the loss of assistance at parking speeds encountered when the engine is stalled while manoeuvring.
- Power from the engine is absent in electric vehicles and occasionally unavailable in hybrid vehicles. A popular solution is to use an electric drive to generate hydraulic pressure for power assistance, which is complex, inefficient, expensive and often noisy.

As with hydraulic systems, current production electrically power assisted steering (EPAS) systems use a torsion bar to measure input torque, with small angle sensors to measure angular deflection. The torsion bar is typically stiffer than that used in a hydraulic system, which has the effect of reducing the understeer gradient of the vehicle. As with hydraulic systems, a dead band in the torque response to angular deflection of the torsion bar is required to avoid on-centre oscillation.

A steering system is subject to inputs from the driver varying from 0 to as much as 30 Nm of effort under parking manoeuvres. In driving conditions, the torque required varies between 0 and 10 Nm, depending on the vehicle. Typically, the peak steering input torque for an assisted system is around 5 Nm.

The advantages of EPAS systems include:
- Relationship of input to output torque can be made variable
- Failure mode the same as conventional hydraulic systems
- Cheaper and more flexible to tune than hydraulic systems The disadvantages of EPAS systems include:
- Torque hysteresis problems
- Control system compromised by measures taken to control torsional vibration (dead band)
- No large scale variation in steering ratio possible
- Often criticised for 'dead' feeling We are aware of a differential type speed assistance system disclosed in U.S. Pat. No. 4,715,462. This featured an epicyclic train as a differential device inserted into the steering column.

The system is connected in series with the steering column. It comprises an epicyclic train, two position sensors and an electric motor. The steering column connects the hand wheel (steering wheel) to the sun gear of the epicyclic, and terminates at that point. The planet gear carrier is connected to a secondary steering column, which is connected to the steering rack. An annular gear is fitted around the sun and planets as in a typical epicyclic train. The annulus is, in turn driven by an electric motor through a 'worm and nut' gear linkage.

Envisage a situation where the motor, and hence the annulus, are locked stationary to the vehicle body: By virtue of the gear reduction, the steering torque is defined as follows:

$$\frac{Ts}{Tr} = \frac{1}{1+G}$$

Where:
Ts=Hand wheel torque
Tr=Torque at steering rack input
G=Annulus radius/sun radius Without annulus control, the result would be a low geared steering system, with an excessive amount of hand wheel turns 'lock to lock'. The steering effort would, however, be reduced proportionally.

Angular position sensors would be fitted to the primary steering column and to the annulus, linked to a simple feedback controller. On turning the hand wheel, the controller detects the difference in demand and actual steered wheel position, and turns the annulus to rectify this.

Clearly, the controller bandwidth and drive system response will need to be sufficient to prevent the driver detecting any phase lag between steering input and the car's response. A car's tyre takes approximately 1 radian of rotation to fully develop a slip angle giving a less than instantaneous response to driver input (equating to approximately 7 ms at 100 mph). The driver's input is unlikely to be much in excess of 3 rad/s of hand wheel movement.

The feedback to the hand wheel is always defined by the equation above; not by the intricacies of hydraulic valving. A car's steering weight will simply feel like that of a lighter vehicle without power assistance. Such a system has the advantage of a fully variable ratio steering system.

As such, it is desired to at least partially ameliorate the problems highlighted above with the prior art, and to provide alternatives to the presently available couplings.

According to a first aspect of the invention, we provide a variable mechanical advantage shaft coupling, comprising:
 an input shaft;
 an output shaft; and
 at least one lever,
each lever comprising:
 a lever body;
 a first connection connecting the lever body to a first shaft of the input shaft and the output shaft at a point offset from an axis of rotation of the first shaft so that the lever body can pivot relative to the first shaft;
 a second connection to the lever body to a second, different, shaft of the input shaft and the output shaft at a point offset from its axis of rotation so that the lever body can pivot relative to the second shaft; and
 a fulcrum point about which the lever body can pivot;
in which each first connection is able to slide along an axis substantially parallel to the axes of rotation of the first and second shafts along the respective lever body, each lever connecting the input and output shafts with a mechanical advantage that varies dependent upon the position of each sliding connection along the first shaft.

Thus, by providing at least one lever to join the input and output shafts, and having the sliding connection, a varying mechanical advantage can be generated between the input and output shafts, with the only requirement for changing the mechanical advantage being the sliding of the first connection. This can be useful in many situations.

The coupling may comprise a sliding carrier for each first connection, each sliding carrier being slidingly mounted on the first shaft so as to be able to slide along the axis of the first shaft but being rotationally coupled to the first shaft for rotation about the axis of the first shaft. In one example, each sliding carrier may be mounted on the first shaft through a splined coupling. Thus, rotational motion of the first shaft can be coupled to or from the sliding carrier and hence to the lever.

There may be provided a sliding carrier for each first connection; however, in the preferred embodiment, there is a common sliding carrier for all first connections. Each lever body may be pivotally mounted in the common sliding carrier, the pivotal mounting of each lever body allowing the respective lever body to slide through the pivotal mounting along a length of the lever body.

The coupling may comprise an actuator arranged to slide each first connection along the axis of the first shaft. Where the common sliding carrier is provided, the actuator may act on the common sliding carrier, typically so as to drive it along the axis of the first shaft. The actuator may comprise a linear electric motor, a solenoid or other such suitable actuator.

Thus, we provide an actuator that can cause the mechanical advantage of the coupling to change.

The coupling may comprise a fixed carrier for each second connection, each fixed carrier being fixed relative to the second shaft, with each lever body being pivotally mounted for rotation relative to the fixed carrier. Thus, each lever can transmit rotational motion to the respective fixed carrier. There may be provided a fixed carrier for each second connection; however, in the preferred embodiment, there is a common fixed carrier for all second connections.

Each fulcrum may be provided in a fulcrum carrier; typically, there will be a common fulcrum carrier for all of the levers although, alternatively, there may be a fulcrum carrier for each lever. Each lever body may be pivotally mounted in the respective fulcrum carrier, typically such that the lever body can pivot relative to the fulcrum carrier but not move along a length of the lever body.

Where a common fulcrum carrier is provided, the common fulcrum carrier can be mounted for rotation about the second shaft.

The coupling may be provided with an assistance motor, arranged to apply an assistance torque to the output shaft. As such, the motor may be coupled to the common fulcrum carrier.

The coupling may be provided with an angular limitation device, which couples the input and output shafts should the relative angular displacement of the input and output shafts exceed a range. Thus, if there is a fault in the coupling, the input and output shafts will be directly linked together.

In the preferred embodiment, the first shaft is the input shaft and the second shaft is the output shaft. There may be two levers, or possibly more.

According to a second aspect of the invention, there is provided an electric power assisted steering system, comprising a steering wheel coupled to a steering wheel shaft; a steering mechanism coupled to a steering mechanism shaft, the steering mechanism arranged to change a steering angle of at least one road wheel of a vehicle dependent upon rotation of the steering mechanism shaft; and a variable mechanical advantage shaft coupling in accordance with the first aspect of the invention, in which the steering wheel shaft forms the input shaft of the coupling and the steering mechanism shaft forms the output shaft of the coupling.

Thus, we use the coupling described above in an electric power assisted steering system. This allows the amount of mechanical assistance provided by the steering system to be varied; when carrying out moves such as parking the mechanical advantage will be high, whilst when driving on major highways at speed, the mechanical assistance provided can be reduced, as only small forces are required, and the distance moved by the steering wheel can also be reduced.

There now follows, by way of example only, description of an embodiment of the invention described with reference to the accompanying drawings, in which:

FIGS. 3 to 5 shows plan views of the coupling of FIG. 1, achieving different mechanical advantages.

Figure 1:
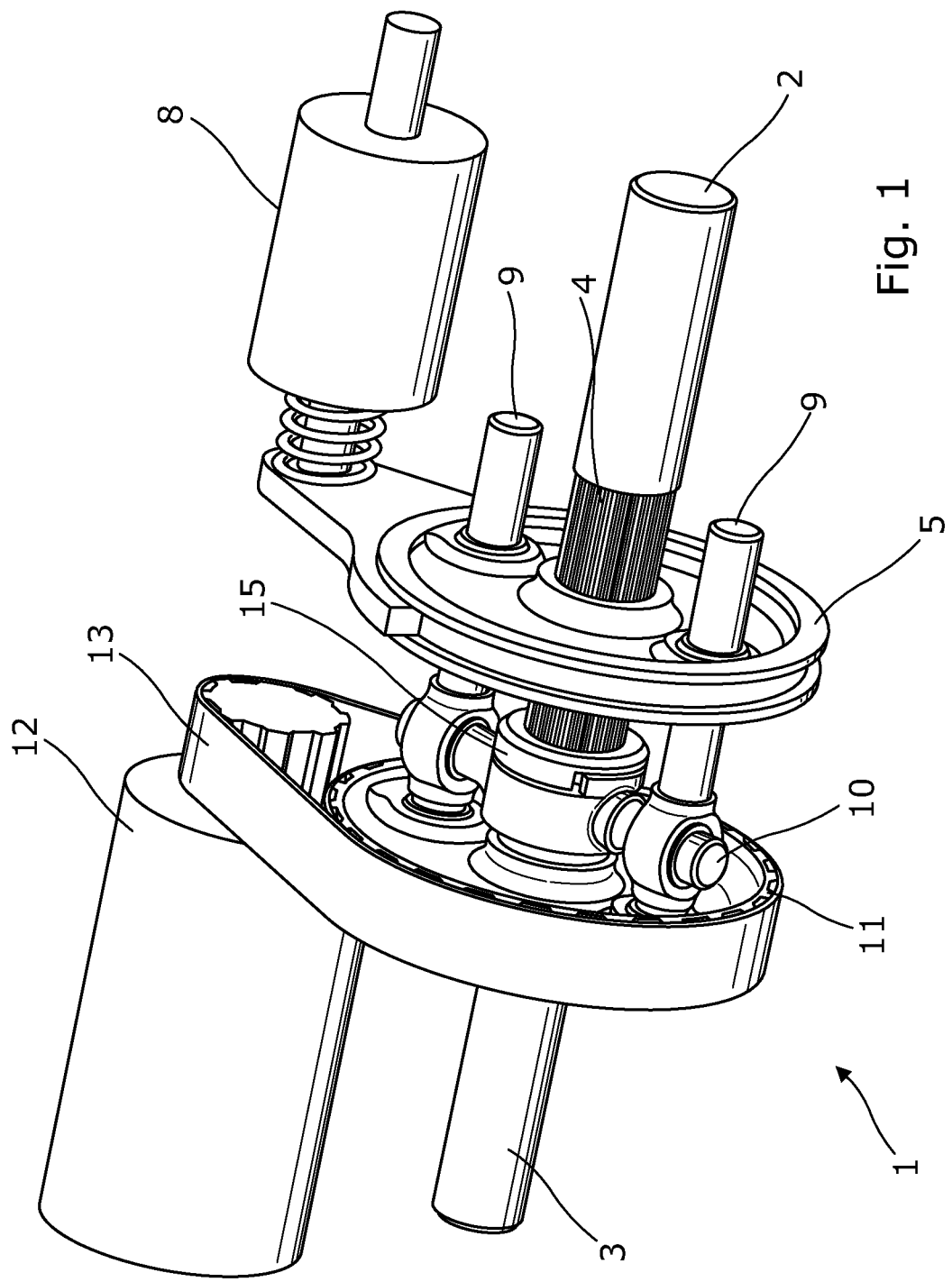
FIG. 1 shows a perspective view of a variable mechanical advantage shaft coupling in accordance with an embodiment of the invention.
Figure 2:
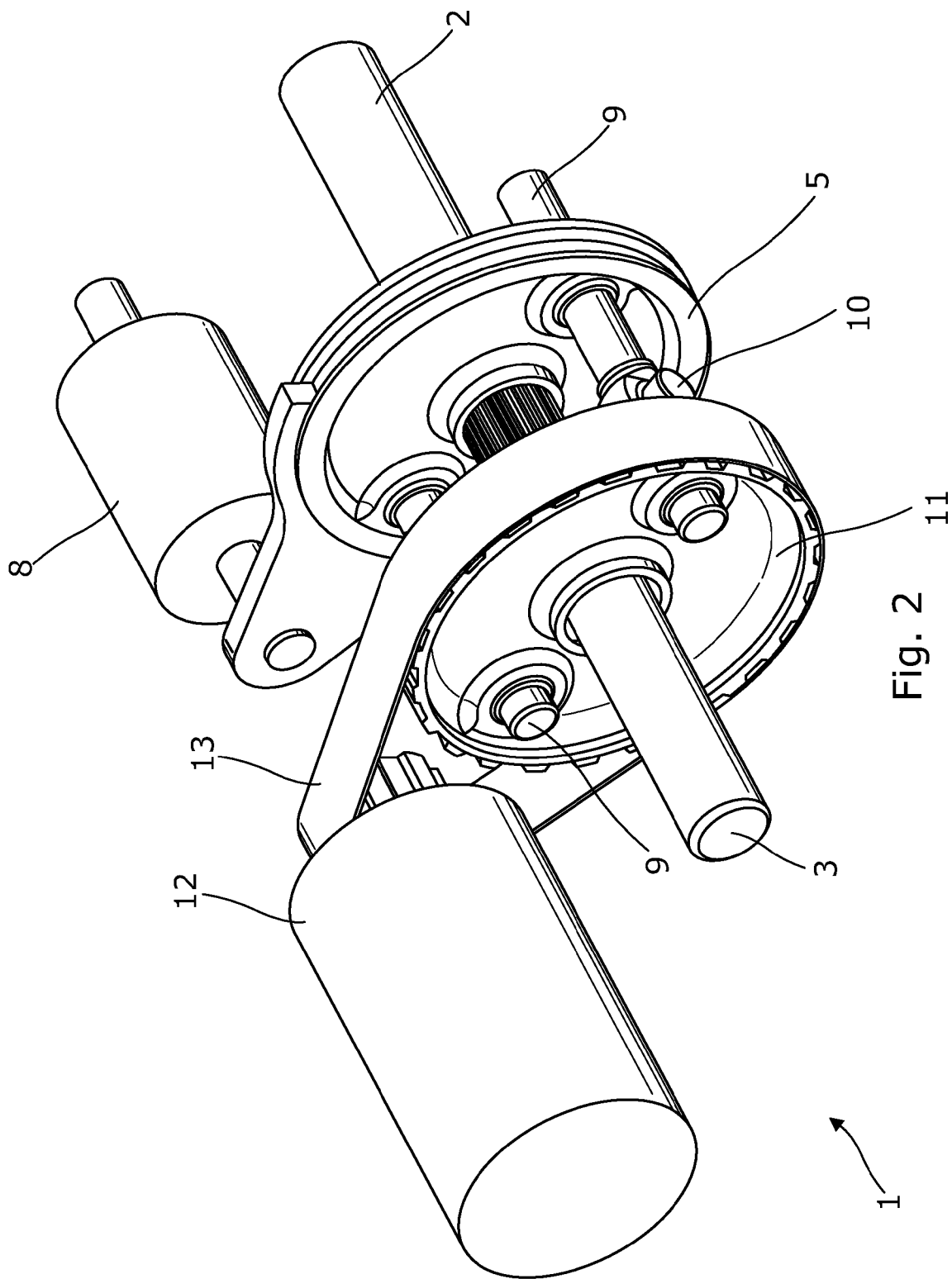
FIG. 2 shows a further perspective view of the coupling of FIG. 1.

A variable mechanical advantage shaft coupling 1 in accordance with an embodiment of the invention is shown in FIGS. 1 to 5 of the accompanying drawings. This coupling 1 will typically be used in an electric power assisted steering (EPAS) system 100, as shown in FIG. 6 of the accompanying drawings.

The coupling 1 couples an input shaft 2 to an output shaft 3. The shafts 2, 3 are coaxial, with terminals ends of each shaft 2, 3 being in close proximity, without contact. Typically, the input shaft 2 will be coupled to a steering wheel 101 of the EPAS system; indeed, the steering wheel 101 can be mounted on the input shaft 2.

Figure 6:
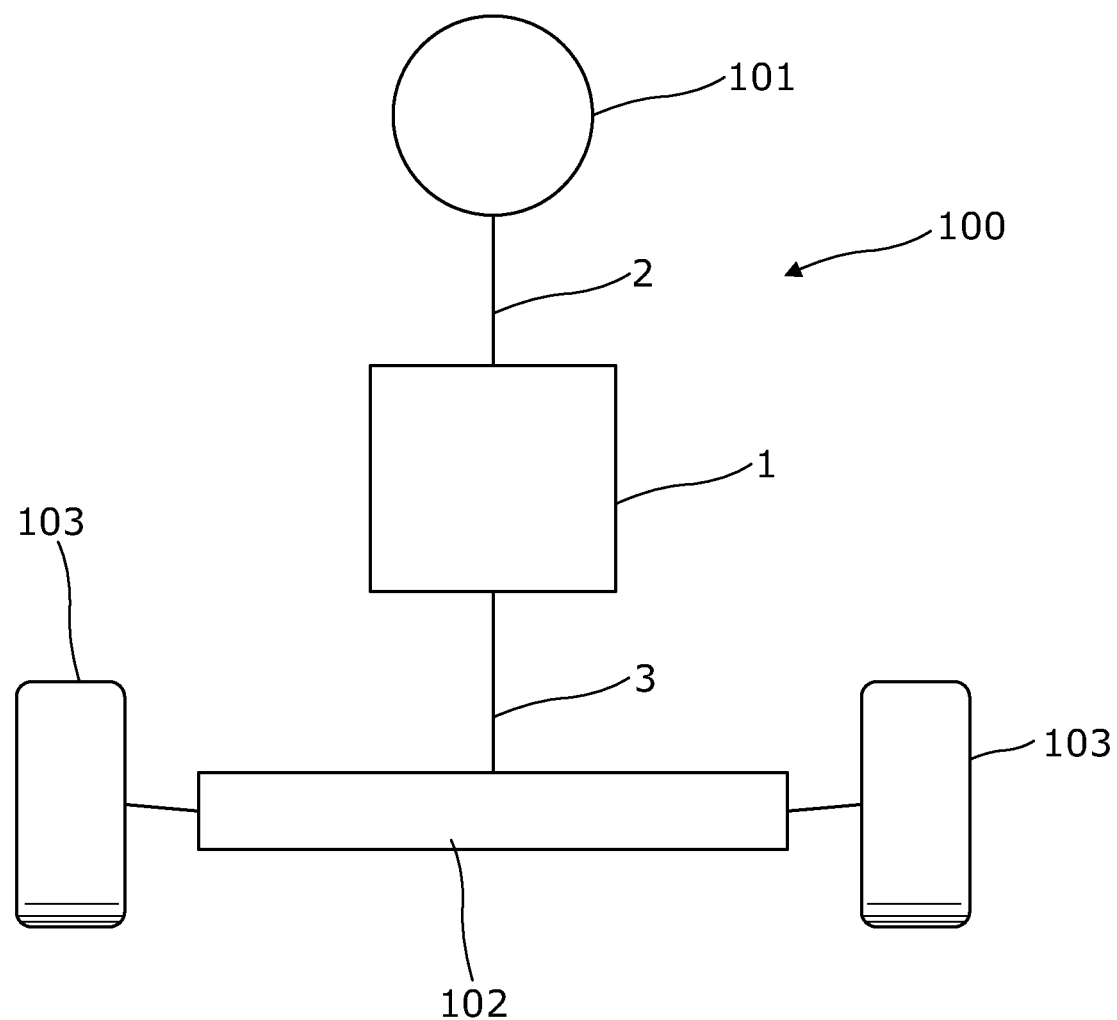
FIG. 6 shows a schematic view of an electric power assisted steering system making use of the coupling of FIG. 1.

The output shaft 3 will be connected to the steering mechanism 102 which is arranged to change the steering angle of roadwheels 103 of a vehicle to which it is fitted; in the example of FIG. 6, a rack and pinion steering mechanism is schematically depicted. Rotation of the output shaft 3 therefore drives the change in steering angle of the vehicle.

The input shaft 2 is provided with a splined portion 4 at its terminal end. On this splined portion, there is provided a sliding carrier 5. The sliding carrier 5 is of the form of an annular disc coaxially mounted on the input shaft 2, with a splined central bore 6 through which the splined portion 4 of the input shaft 2 passes. Accordingly, the sliding carrier 5 is free to slide along the common axis 7 of the shafts 2, 3, but will rotate with the input shaft 2.

An actuator 8 is provided to drive the sliding motion of the sliding carrier 5; this actuator may comprise a linear motor, a solenoid, a rack and pinion arrangement or any other convenient method of causing linear motion of the sliding carrier 5 whilst still allowing it to rotate about the axis 7.

Two levers 9 are pivotally coupled to the sliding carrier 5. Each lever is of the form of a tubular body, positioned generally parallel to the axis 7 but capable of movement relative thereto as described below. The two levers are positioned diametrically opposite to one another around the sliding carrier 5 relative to the axis 7.

The mounting of each lever 9 in the sliding carrier 5 allows the lever to pivot about the sliding carrier and movement of the lever 9 along its own length. However, the mountings will transmit forces between the sliding carrier 5 and the levers 9 that are perpendicular to the length of the levers 9, that is tangentially relative to the axis 7; as such, rotation of the sliding carrier 5 will tend to exert a force on the levers perpendicular to their lengths.

The output shaft 3 is provided with a fixed carrier 10, of the form of a tubular bar fixed perpendicularly to the terminal end of the output shaft 3. The levers 9 are connected to opposing ends of the fixed carrier 10 by pivoting mountings that only allow pivoting movement of the respective lever 9 about the length of the fixed carrier 10 (and so perpendicularly to the axis 7). Note that they are also allowed to move along the axes 10 to ensure that the system is not over constrained while still being able to transmit tangential force resulting in a torque applied to the output shaft.

A fulcrum carrier 11 is provided concentric with the output shaft 3; this is of the form of an annular disc coaxially mounted with the output shaft 3 through a bearing that allows relative rotation of the fulcrum carrier 11 and the output shaft 3. A modest amount of axial translation between lever 9 and fulcrum carrier 11 along the axis of lever 9 is also provided. Each of the levers 9 is pivotally connected to the fulcrum disc at diametrically opposed points around the axis 7 through a coupling that allows both pivotal motion of the respective lever 9 about the fulcrum carrier 11 but will transmit forces between the levers 9 and the fulcrum carrier 11 that are perpendicular to the length of the levers 9, that is tangentially relative to the axis 7.

A drive motor 12 is provided that is coupled to the fulcrum carrier 11 through a drive belt 13. The drive motor 12 can therefore cause rotation of the fulcrum carrier 11.

As such, when a user of the EPAS system 100 desires to steer their vehicle, they will turn the steering wheel 100. This will cause rotation of the input shaft 2. This is transmitted through the sliding carrier to the levers 9. Each lever 9 acts as a lever with the effort being applied at the sliding carrier, the load being at the fixed carrier 10 and the fulcrum at the fulcrum carrier 11 (a second class lever). The force applied by the user is therefore transmitted to the output shaft after having been subjected to the mechanical advantage of the coupling, and is transmitted onwards by the output shaft 3 to the steering mechanism 102.

It can therefore be seen that the mechanical advantage of the coupling will depend upon the distance between the sliding carrier 5 and the fulcrum carrier 11. As the sliding carrier 5 is slid along the splined portion 4, the mechanical advantage will vary.

Taking the force applied on one lever 9 by the sliding disc as F, the force applied by the lever 9 on the fixed carrier as L, the distance of the sliding carrier 5 from the fulcrum disc 11 as a and the (fixed) distance of the fixed carrier 11 from the fulcrum disc as b, then by the lever equation:

$$Fa = Lb$$

which implies:

$$L = F\frac{a}{b}$$

and that the mechanical advantage is given as:

$$MA = \frac{L}{F} = \frac{a}{b}.$$

This assumes that the levers 9 are generally parallel to the axis 7 and so engage the fixed 5 and sliding 11 carriers at the same radial distance relative to the axis 7.

Thus, as the sliding carrier 5 is moved towards the fulcrum carrier 11 (that is moving through the situations shown in FIGS. 3 to 5 of the accompanying drawings in that order), decreasing a, the mechanical advantage of the coupling will decrease, meaning that the amount of torque required at the input shaft 2 to achieve a given torque at the output shaft 3 will increase, but that the rotation of the input shaft required for a given rotation of the output shaft will decrease (which is good for high speed driving). Conversely, moving the sliding carrier 5 away from the fulcrum carrier 11 (moving from FIG. 5 through FIG. 4 to FIG. 3) will increase a and so increase the mechanical advantage at the cost of requiring more rotation of the input shaft for the same rotation of the output shaft (which is good for low speed manoeuvres such as parking), at least at smaller steering angles.

In case of failure of the drive motor 12, which in normal use would act to limit the relative angular motion of the input 2 and output 3 shafts, a dog clutch 15 is provided between the input 2 and output 3 shafts, to limit the relative rotation of the shafts; thus, if the motor 12 is not operative, the shafts will lock and allow the vehicle to be steered. The belt 13 drive allows the user to turn the motor, whereas the worm and wheel gearing of a prior art EPAS system may have made this difficult.

Some advantages of this system include:
Yaw damping control
Light weight
Very direct response, unmasked by the power assistance system
Small hysteresis
Backlash less of a problem than geared systems
Simplicity of manufacture, and low cost.
Variable torque assistance.
Failure modes similar to existing systems.

Any input or change of input causes the levers 9 to move instantaneously in an opposite sense, presuming the resistance in the drive system is less than that from the steering mechanism 102. This is not thought to be a problem with a control system of the correct bandwidth, as the difference in input and output shaft angles would be detected, resulting in motor torque to react the handwheel input torque.

The invention claimed is:

1. A variable mechanical advantage shaft coupling, comprising:
   an input shaft;
   an output shaft; and
   one or more levers, each lever of the one or more levers comprising:
      a lever body;
      a first connection connecting the lever body to a first shaft at a point offset from an axis of rotation of the first shaft so that the lever body can pivot relative to the first shaft, the first shaft being either the input shaft or the output shaft;
      a second connection connecting the lever body to a second shaft at a point offset from its axis of rotation so that the lever body can pivot relative to the second shaft, the second shaft being different from the first shaft and being either the input shaft or the output shaft; and
      a fulcrum point about which the lever body can pivot,
   in which the first connection of each lever is able to slide along an axis substantially parallel to the axes of rotation of the first and second shafts along the respective lever body, each lever connecting the input and output shafts with a mechanical advantage that varies dependent upon a position of the first connection of each lever along the first shaft.

2. The coupling of claim 1, comprising a sliding carrier for the first connection of each lever, the sliding carrier for the first connection of each lever being slidingly mounted on the first shaft so as to be able to slide along the axis of the first shaft but being rotationally coupled to the first shaft for rotation about the axis of the first shaft.

3. The coupling of claim 2, in which the sliding carrier for the first connection of each lever is mounted on the first shaft through a splined coupling.

4. The coupling of claim 2, in which there is a common sliding carrier for all first connections of the one or more levers.

5. The coupling of claim 4, in which the lever body of each lever is pivotally mounted in the common sliding carrier, the pivotal mounting of the lever body of each lever allowing the lever body to slide through the pivotal mounting along a length of the lever body.

6. The coupling of claim 1, comprising an actuator arranged to slide the first connection of each lever along the axis of the first shaft.

7. The coupling of claim 6, comprising:
   a sliding carrier for the first connection of each lever, the sliding carrier for the first connection of each lever being slidingly mounted on the first shaft so as to be able to slide along the axis of the first shaft but being rotationally coupled to the first shaft for rotation about the axis of the first shaft;
   in which there is a common sliding carrier for all first connections of the one or more levers; and
   in which the actuator acts on the common sliding carrier, so as to drive it along the axis of the first shaft.

8. The coupling of claim 1, comprising a fixed carrier for the second connection of each lever, the fixed carrier for the second connection of each lever being fixed relative to the second shaft, with the lever body of each lever being pivotally mounted for rotation relative to the fixed carrier.

9. The coupling of claim 8, in which there is a common fixed carrier for all second connections of the one or more levers.

10. The coupling of claim 1, in which the fulcrum point of each lever is provided in a fulcrum carrier.

11. The coupling of claim 10, in which there is a common fulcrum carrier for all of the levers of the one or more levers.

12. The coupling of claim 11, in which the common fulcrum carrier is mounted for rotation about the second shaft.

13. The coupling of claim 10, in which the lever body of each lever is pivotally mounted in the respective fulcrum carrier, such that the lever body can pivot relative to the fulcrum carrier but not move along a length of the lever body.

14. The coupling of claim 1, provided with an assistance motor, arranged to apply an assistance torque to the output shaft.

15. The coupling of claim 14 in which the fulcrum point of each lever is provided in a fulcrum carrier, and in which the assistance motor is coupled to the common fulcrum carrier.

16. The coupling of claim 1, comprising an angular limitation device, which couples the input and output shafts should a relative angular displacement of the input and output shafts exceed a range.

17. The coupling of claim 1, in which the first shaft is the input shaft and the second shaft is the output shaft.

18. An electric power assisted steering system, comprising:
   a steering wheel coupled to a steering wheel shaft;
   a steering mechanism coupled to a steering mechanism shaft, the steering mechanism arranged to change a steering angle of at least one road wheel of a vehicle dependent upon rotation of the steering mechanism shaft; and
   a variable mechanical advantage shaft coupling, comprising:
      an input shaft;
      an output shaft; and
      one or more levers, each lever of the one or more levers comprising:
         a lever body;
         a first connection connecting the lever body to a first shaft at a point offset from an axis of rotation of the first shaft so that the lever body can pivot relative to the first shaft, the first shaft being either the input shaft or the output shaft;
         a second connection connecting the lever body to a second shaft at a point offset from its axis of rotation so that the lever body can pivot relative to the second shaft, the second shaft being different from the first shaft and being either the input shaft or the output shaft; and a fulcrum point about which the lever body can pivot, in which the first connection of each lever is able to slide along an axis substantially parallel to the axes of rotation of the first and second shafts along the respective lever body, each lever connecting the input and output shafts with a mechanical advantage that varies dependent upon a position of the first connection of each lever along the first shaft; and in which the steering wheel shaft forms the input shaft of the coupling and the steering mechanism shaft forms the output shaft of the coupling.

19. A vehicle comprising the electric power assisted steering system of claim 18.

20. A vehicle comprising the variable mechanical advantage shaft coupling of claim 1.

* * * * *